April 17, 1962   M. M. KAHN   3,029,843
FLEXIBLE HOSE AND METHOD OF MAKING SAME
Filed Nov. 1, 1957   2 Sheets-Sheet 1
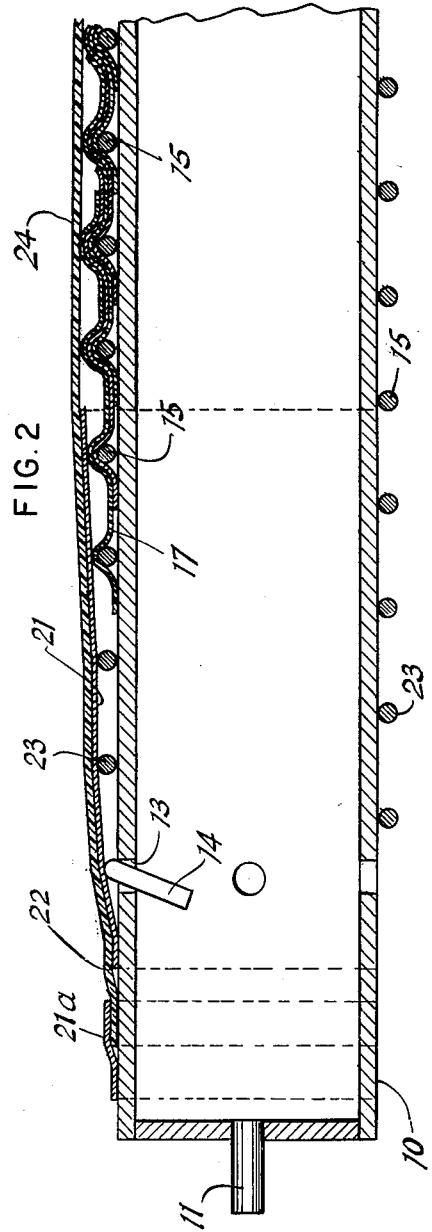
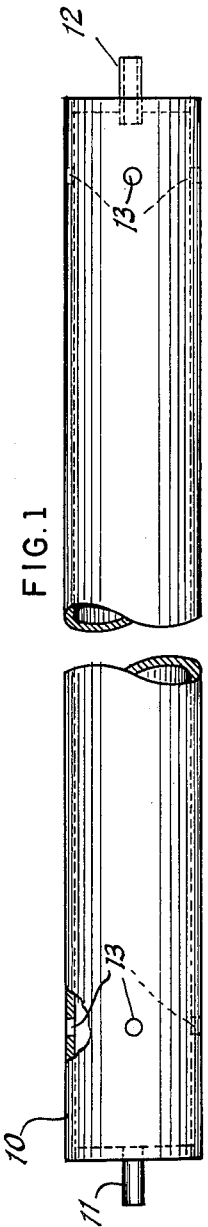
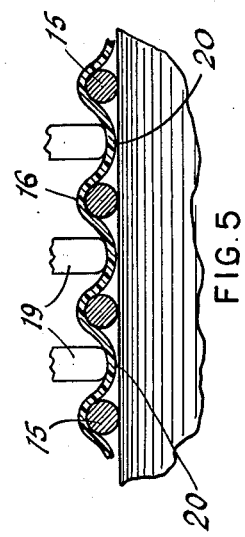
INVENTOR.
Marvin M. Kahn
BY Philip G. Hilbert
ATTORNEY April 17, 1962  M. M. KAHN  3,029,843
FLEXIBLE HOSE AND METHOD OF MAKING SAME
Filed Nov. 1, 1957  2 Sheets-Sheet 2

INVENTOR.
Marvin M. Kahn
BY
Philip G. Hilbert
ATTORNEY

United States Patent Office 3,029,843
Patented Apr. 17, 1962

3,029,843
FLEXIBLE HOSE AND METHOD OF
MAKING SAME
Marvin M. Kahn, Trenton, N.J., assignor to The Acme-Hamilton Manufacturing Corp., New York, N.Y., a corporation of Delaware
Filed Nov. 1, 1957, Ser. No. 694,012
12 Claims. (Cl. 138—122)

This invention relates to plastic flexible hose and a method of making the same. More particularly, the invention concerns the making of flexible, high strength hose from synthetic resin materials.

While it has been proposed to make flexible hose from synthetic plastic materials and including metal wire reinforcements in the hose carcass, such constructions display some shortcomings in respect to ultimate resistance to cracking; undue longitudinal contraction when used as vacuum conduits, and the like.

Accordingly, an object of this invention is to provide an improved flexible hose construction having a carcass of synthetic plastic material and a wire reinforcement, wherein the disposition of the carcass material relative to the wire reinforcement is such as to provide substantial wall thickness at points subject to high stress in use, yet maintaining flexibility for the hose as a whole.

A further object of this invention is to provide a hose of the character described, wherein the carcass thereof is made up of inner and outer portions of plastic material in association with the wire reinforcement, the portions being of different structural character yet cooperative to insure maximum resistance to breaking stresses at points of flexure and resistant to longitudinal contraction when the hose is used as a vacuum conduit.

Still another object of this invention is to provide a hose of the character described, in which the carcass material encloses a helical wire reinforcement except for a very small portion of the circumferential extent of the wire cross section which is exposed on the inner surface of the hose; said wire reinforcement being in a non-bonded, floating relation to the enclosing portions of the carcass, thereby imparting flexibility as well as toughness to the hose and reducing stresses at points of extreme flexure when the hose is in use.

Still another object of this invention is to provide an improved method of making flexible hose from synthetic plastic materials and wire reinforcing, wherein the several components are associated and combined in a simple manner and with minimum production costs; manipulative steps being used to aid in the production of a tough, high strength, yet flexible hose structure.

Other objects of this invention will in part be obvious and in part hereinafter pointed out.

In the drawing:

FIG. 1 is an elevational view of a mandrel used in making the hose embodying the invention;

FIG. 2 is a longitudinal sectional view of the left hand end of the mandrel, showing the several helically wound components of the hose thereon;

FIG. 5 is a partial elevational view showing the depression of the tape as it approaches the mandrel, along laterally spaced, longitudinally extending zones;

Figure 3:
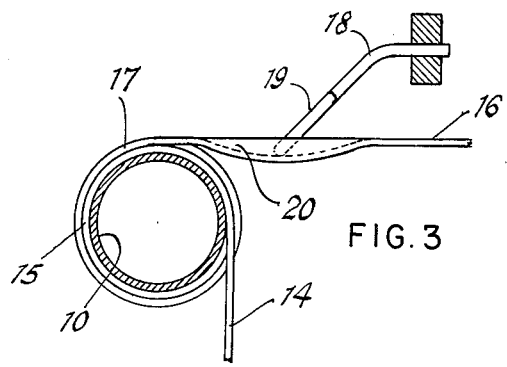
FIG. 3 is a transverse sectional view showing the tape and wire winding operation.

In accordance with the instant invention, the hose construction is made up of an inner carcass portion comprising a helically wound synthetic thermoplastic tape in association with a helically wound wire reinforcement, and an outer carcass portion comprising a seamless sheath of synthetic thermoplastic material drawn over the inner carcass, the inner and outer portions being consolidated and integrated by means of vacuum and fusion technique.

In forming the inner carcass portion, the tape is helically wound over the wire convolutions in a manner to dispose a plurality of overlapping tape plies over each wire convolution and with no tape plies under the wire convolutions. The tape is wound under tension with a preforming action which gives the moving tape an undulating cross section which complements and conforms with the helical arrangement of the wire convolutions.

Referring in detail to the drawing, and particularly to FIG. 1, 10 designates a hollow mandrel of suitable length, upon which the hose of the instant invention is formed. Such mandrel is provided with a solid plug 11 at one end and a tubular connector 12 at the other end for connection to a vacuum manifold, not shown. The mandrel 10 is formed at the opposite ends thereof with several circumferentially spaced openings 13, for the purpose later described.

The mandrel 10 is adapted to be mounted for rotation, in a turning lathe, not shown, in a manner known in the art. Suitable means is provided for feeding a continuous length of wire 14 to the rotating mandrel 10 to produce helical turns of wire 15 on the mandrel at a determined axial spacing. Concurrently with the feed of wire 14 to mandrel 10, a tape 16 of synthetic plastic such as vinyl copolymer, vinyl chloride polymer, polystyrene or the like, of selected width and gauge, is also fed in a helical manner to mandrel 10 to provide overlapping turns 17 which overlie the helical wire turns 15.

It is apparent that the width of tape 16 and the amount of overlap of the helical turns 17 thereof will determine the number of superposed tape plies over each turn of wire 15. For the purpose of illustration, the showing in the drawing involves a tape width and overlap to provide 4 tape plies over each wire turn, it being understood that the number of plies may be greater or lesser than such number, as desired.

The means for feeding wire 14 and tape 16 to mandrel 10, comprising a feeding head, not shown, arranged for longitudinal movement along the bed of the turning lathe, not shown, may be similar to the feeding means more fully detailed in application Ser. No. 642,744, filed February 27, 1957, now Patent 2,874,723, except that the relative disposition of wire 14 and tape 16 moving from the feeding head to mandrel 10 is such that the tape turns 17 are all over the wire turns 15.

Tape 16 is fed under tension and simultaneously subjected to the action of means which produces laterally spaced, depressed zones in the tape as the same approaches the mandrel 10 and is associated with wire turns 15. Such means may take the form of a forked device 18 suitably mounted on the tape feed head, not shown, and having a series of parallel, downwardly extending prongs 19, the lower ends of which impinge on moving, tensioned tape 16, depressing the contacted portions of the tape below the plane thereof, to produce laterally spaced, longitudinally extending zones 20 of substantially U-shaped section. The device 18 is so positioned that the resultant zones 20 in tape 16 will be aligned with the spaces between wire turns 15 as they are formed on mandrel 10. The device 18 has a number of prongs 19 amounting to one less than the number of superposed tape plies 17 over each wire turn 15, and therefore in the instant showing, there are three prongs 19 on device 18.

In starting the formation of a hose on mandrel 10, the starting end of wire 14 is inserted in one of the openings 13 on the left hand end of mandrel 10, such openings being somewhat larger in diameter than that of the wire. The mandrel 10 is turned to start the helical wind of wire 14 and then the feed of tape 16 is commenced, thereby leaving a number of the initial wire turns 15 uncovered by tape turns 17. The winding of wire 14 and tape 16 is continued until the opposite end of mandrel 10 is reached, at which time, the feed of tape 16 is stopped to provide a few end turns of uncovered wire 14, the terminal end of which is inserted in one of the openings 13 at the right hand end of the mandrel 10.

Figure 6:
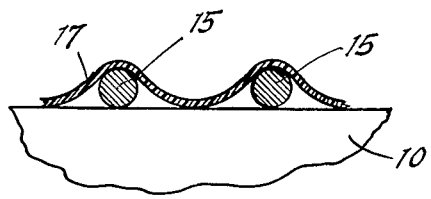
FIG. 6 is a partial longitudinal sectional view showing the tape convolutions in conformed relation to the wire turns.
Figure 4:
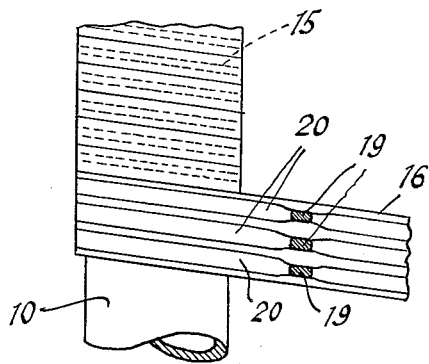
FIG. 4 is a top plan view thereof.

With tape 16 helically wound over the wire turns 15 under tension and pre-contoured laterally by means of device 18, the tape turns 17 tend to conform to the cross section of the wire turns 15 to produce a corrugated outer appearance as indicated in FIG. 6.

At this time, a rubber impregnated fabric tape 21 is helically wound on the left hand end of mandrel 10, starting at a point 22 between plug 11 and openings 13 and continuing over the uncovered wire turn portions 23 and an initial portion of the helically wound tape 16. The same is done at the right hand end of mandrel 10.

Figure 7:
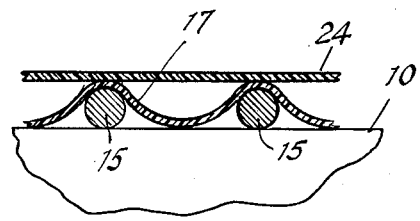
FIG. 7 is a view similar to that of FIG. 6, showing the seamless sheath drawn over the tape and wire turns.

An extruded, seamless tubing 24 of a synthetic thermoplastic material, such as a vinyl copolymer somewhat softer than the material of tape 16, is drawn over the helically wound tape 16 to form an outer sheath portion as indicated in FIG. 7. Tubing 24 may be about 1/8" larger in diameter than the mandrel diameter to insure a slightly snug fit over the tops of the corrugations formed by the tape and wire of the inner carcass portion. The tubing may be applied by blowing or cross heading operations, as known in the art.

The ends of tubing 24 extend somewhat beyond the tape 21, and the tubing ends are taped down to mandrel 10 by a few turns of rubber impregnated fabric tape 21a to make the opposite ends of said tubing substantially air tight. A number of mandrels 10, carrying the helically wound tape 16 and wire 14, together with tubing 24, as described above, may be mounted in racks and moved into a heated oven, not shown. While in the oven, a source of vacuum, not shown, is connected by a suitable manifold to connectors 12 on the mandrels 10.

A vacuum of about 15" or more of mercury is applied and the oven is maintained at about 355° F. for about 25 minutes. Communication is established between the interior of mandrel 10 and the space between the inner carcass portion formed by tape turns 17 and the outer surface of the mandrel, following the wire turns 15 through openings 13. Also, the space between the outer corrugated surface of the inner carcass portion and the inner surface of tubing sheath 24 communicates with the oversize openings 13 by way of the channel left open through the bridging effect of tape 21 over the corrugations of the inner carcass portion.

Accordingly, the vacuum will have a pull-down effect on both the tape 16 and tubing 24, whereby the tape turns 17 will more closely conform to the wire turns 15, and in turn the tubing 24 will assume a corrugated appearance with the valley portions thereof urging underlying tape portions about the lower circumferential portions of the wire turns 15.

Figure 8:
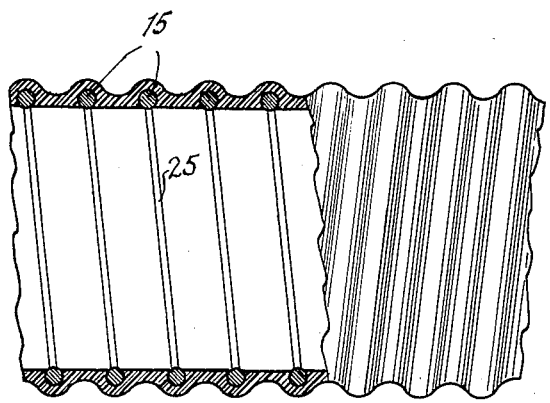
FIG. 8 is an elevational view of the completed hose construction, with a longitudinal portion cut away to show the integrated inner and outer carcass portions.

Simultaneously with the action of the vacuum, the heat of the oven will fuse and integrate the tape 16 and tubing 24 with the wire turns 15 encased in the resultant carcass except for a very narrow circumferential portion on the underside thereof, indicated at 25 in FIG. 8. Since no adhesive is provided between wire turns 15 and the overlying plastic tape turns 17, the wire turns 15 are in a floating, non-bonded relation to the encasing carcass, thereby insuring maximum flexibility to the finished hose, without danger of dislodgment of the wire turns even upon extreme flexure of the hose.

It will also be apparent, from a consideration of FIG. 8, that there is a disposition of the bulk of the thermoplastic material about the wire turns 15 which gives added strength and toughness to the hose, yet not impairing the flexibility thereof. The integrated hose construction thus produced, is removed from the mandrels 10 and trimmed at the ends thereof to prepare the same for association with adapters, couplings or the like.

The wire 14 may be formed from hard drawn aluminum or aluminum alloys which permits the wire turns 15 to maintain their set after the heat treatment which fuses the inner and outer thermoplastic carcass portion. The wire may have a diameter of about 0.094" and may be used with a tape 16 of 0.012" gauge and a tubing 24 of about 0.028" gauge, in making a hose of 1½" diameter. Obviously, these values may be varied to suit the production of hose of different diameters and in accordance with expected usage conditions.

It has been found that hose made in accordance with the instant invention show unusual resistance to stresses at points adjacent the wire turns in the valley portions of the thermoplastic carcass, thus providing toughness and strength without impairment of flexibility. Also, the hose is extremely resistant to longitudinal contraction when used as a vacuum conduit.

It is understood that the basic carcass structure disclosed herein may be further modified to include additional reinforcements such as braided, knit or other types of fabric reinforcing, disposed within the wall structure.

Furthermore, the hose may be made with any selected number of superposed tape plies over each wire turn, by appropriate selection of the tape width and adjustment of the longitudinal spacing between adjacent wire turns. In each case, the device 18 is provided with a number of prongs 19 amounting to one less than the number of superposed plies of tape over each wire turn.

As various changes might be made in the embodiment of the invention herein shown without departing from the spirit thereof, it is understood that all matter shown or described shall be deemed illustrative and not limiting except as set forth in the appended claims.

Having thus disclosed my invention, I claim as new and desire to protect by Letters Patent:

1. A flexible hose comprising a helically wound wire reinforcement, a longitudinally continuous inner carcass portion comprising a helically wound thermoplastic synthetic resin tape with successive convolutions in overlapping relation and overlying the wire turns, and an outer carcass portion comprising a seamless tube of thermoplastic synthetic resin material overlying said inner carcass portion, said inner and outer carcass portions closely conforming to the major portion of the circumferential extent of the cross section of each wire turn while leaving the innermost portion of said wire turns exposed, said inner and outer carcass portions having opposed surface portions thereof in integrated, fused relation, said wire turns being in floating, non-bonded relation to the conforming carcass portions.

2. A flexible hose comprising a helically wound wire reinforcement, a carcass including an inner portion partially surrounding the wire convolutions of said wire reinforcement, said inner carcass portion comprising helically wound thermoplastic resin tape in direct contact with the outermost and lateral portions of the wire turns, said carcass further including an outer portion comprising a thermoplastic resin sheath in direct, fused contact with said inner carcass portion, said wire reinforcement being in floating, non-bonded relation to the inner carcass portion.

3. A tough, flexible hose construction comprising a carcass including inner and outer portions of thermoplastic synthetic resin material with opposed surface portions thereof in fused, integrated relation, the inner portion comprising a helically wound tape, the outer portion comprising a seamless sheath, and a helically wound wire reinforcement having each turn thereof substantially encased by said inner carcass portion and leaving said wire turns in a floating, non-bonded relation to the encasing carcass portion, said inner and outer carcass portions having successive longitudinal portions closely conforming to a major portion of the circumferential extent of the cross section of each wire turn.

4. A hose construction as in claim 3 wherein a small portion of the circumferential extent of the cross section of each wire turn is exposed on the undersurface thereof.

5. A hose construction as in claim 4 wherein said carcass portions include thickened zones disposed adjacent the lateral sides of each wire turn.

6. A hose construction comprising a carcass including inner and outer portions of thermoplastic synthetic resin material, and a helically wound reinforcement having longitudinally spaced convolutions, said inner carcass portion comprising helically wound, overlapping tape layers, the superposed portions of said tape being in integrated relation, longitudinally spaced portions of said integrated tape layers surrounding the major circumferential portions of the convolutions of said reinforcement while leaving minor circumferential portions of said convolutions exposed on the inner surface of said hose construction, said outer carcass portion comprising a seamless tubular sheath with the inner, continuous surface thereof in integrated relation to the outer surface of said helically wound, overlapping tape layers, said reinforcement convolutions being in floating, non-bonded relation to the surrounding portions of said tape layers.

7. A hose construction as in claim 6 wherein said reinforcement is an aluminum alloy and said longitudinally spaced portions of the integrated tape layers closely conform to the major circumferential portions of the convolutions of said reinforcement.

8. The method of forming a flexible hose comprising winding wire helically about a mandrel and directly in contact with the surface thereof to provide spaced turns thereof, helically winding a thermoplastic, synthetic resin tape over the turns of wire with the successive turns of said tape in overlapping relation, covering said helically wound tape with a sheath of thermoplastic, synthetic resin material, radially conforming successive, longitudinally spaced portions of said wound tape and said sheath about successive wire turns and fusing opposed surface portions of said wound tape and sheath together into integrated relation and encasing a major portion of the circumferential extent of each of said wire turns leaving a minor portion of the circumferential extent of each of said wire turns exposed on the inner surface of the hose.

9. The method of claim 8 wherein said tape is longitudinally tensioned as it is wound over said wire turns and continuously depressing at least one longitudinal zone of said tensioned tape below the plane thereof, said depressed tape zone being aligned with a space between adjacent wire turns.

10. The method of making flexible hose comprising assembling on a mandrel a helically wound wire reinforcement, an inner carcass portion of helically wound thermoplastic resin tape with successive overlapping turns over said wire reinforcement and an outer carcass portion comprising a sheath of thermoplastic resin material over said tape, radially moving said carcass portions inwardly to confroming relation to each wire turn of said reinforcement and fusibly integrating said carcass portions to substantially encase said wire turns.

11. The method of claim 10 wherein vacuum is applied to the space between said inner carcass portion and the mandrel and to the space between the inner and outer carcass portions.

12. The method of making flexible hose comprising helically winding on a mandrel reinforcing wire to provide longitudinally spaced turns thereof and simultaneously helically winding over said wire turns a thermoplastic resin tape under longitudinal tension and with adjacent convolutions thereof in overlapping relation whereby to substantially conform the tape convolutions to the respective wire turns, disposing a seamless sheath of thermoplastic resin material over said helically wound tape, radially displacing said sheath to compress and closely conform said tape convolutions to the major portion of the circumferential extent of the respective wire turns, and fusibly integrating said sheath to said tape convolutions.

References Cited in the file of this patent

UNITED STATES PATENTS

| 2,430,081 | Roberts | Nov. 4, 1947 |
| 2,630,157 | Smellie | Mar. 3, 1953 |
| 2,641,301 | Gerber et al. | June 9, 1953 |
| 2,741,267 | McKinley | Apr. 10, 1956 |
| 2,782,803 | Rothermel et al. | Feb. 26, 1957 |

FOREIGN PATENTS

| 261,666 | Great Britain | Nov. 25, 1926 |
| 751,621 | Germany | May 18, 1953 |